United States Patent [19]
French

[11] 3,938,980
[45] Feb. 17, 1976

[54] METHOD AND APPARATUS FOR FORMING TEMPERED GLASS ARTICLES

[75] Inventor: Walter K. French, Montrose, N.Y.

[73] Assignee: The Seagrave Corporation, New York, N.Y.

[22] Filed: Oct. 15, 1974

[21] Appl. No.: 514,422

Related U.S. Application Data

[63] Continuation-in-part of Ser. No. 426,526, Dec. 20, 1973, Pat. No. 3,875,766.

[52] U.S. Cl. .................... 65/114; 65/40; 65/349; 65/351
[51] Int. Cl.² ........................................ C03B 27/00
[58] Field of Search ....... 65/40, 114, 115, 348, 349, 65/350, 351

[56] References Cited
UNITED STATES PATENTS

| | | | |
|---|---|---|---|
| 2,068,799 | 1/1937 | Guyer | 65/115 X |
| 3,293,022 | 12/1966 | Beattie | 65/114 |
| 3,406,022 | 10/1968 | Gehenot | 65/104 X |

FOREIGN PATENTS OR APPLICATIONS

| | | | |
|---|---|---|---|
| 393,491 | 6/1933 | United Kingdom | 65/349 |

*Primary Examiner*—Arthur D. Kellogg
*Attorney, Agent, or Firm*—Mark T. Basseches; Paula T. Basseches

[57] ABSTRACT

This invention relates to a method and apparatus for forming tempered glass articles, the particularly shaped glass articles. The method includes the step of subjecting the glass article to be tempered to a homogeneous heating source while simultaneously quenching surfaces of said article being heated, whereby there is achieved within said article a differential temperature condition sufficient to effect full tempering thereof. Since the surfaces of said article are quenched as the article is being heated, at least the surface portions of the article are retained at a temperature sufficiently low to provide mechanical support for the article, whereby sagging or deformation of the article under gravitational or other influences is prevented, without the necessity for providing form-fitting molds or like appurtenances physically to prevent distortion of the glass article during tempering.

The invention further relates to an apparatus for practicing the noted method.

2 Claims, 3 Drawing Figures

METHOD AND APPARATUS FOR FORMING TEMPERED GLASS ARTICLES

This application is a continuation-in-part of my application Ser. No. 426,526, filed Dec. 20, 1973, now U.S. Pat. No. 3,875,766 entitled METHOD AND APPARATUS FOR THE DIRECT MANUFACTURE OF DISCRETE TEMPERED GLASS SHEETS.

BACKGROUND OF THE INVENTION

1. Field of the Invention

The present invention is in the field of manufacturing tempered glass articles.

2. The Prior Art

As is well known, tempered glass presents certain mechanical advantages over and above conventional annealed glass. Among such advantages there may be mentioned increased mechanical strength and increased resistance to thermal and mechanical shocks. Additionally, tempered glass has the property, when broken, of dicing or falling into a multiplicity of small fragments, the edges of which are relatively dull. As a result of the increased mechanical strength and safety properties of tempered glass, its use has been mandated by many building codes.

Further, it is desirable that lenses, such as eyeglass and camera lenses, be formed of tempered glass, both for purposes of increased ruggedness and to avoid, in the event of breakage, formation of harmful shards or glass fragments.

Notwithstanding the known desirable properties of tempered glass, the employment of structural tempered glass components has been hampered by the difficulty of fabricating the same. Tempering methods heretofore practiced require that the glass element be heated to a temperature somewhere above the annealing point and generally in the range between the annealing and softening points, and thereafter subjected to quenching influences which act in a known manner to effect a condition within the glass wherein shallow zones adjacent the surfaces of the cooled glass are under compression and the internal components of the glass are under tension.

The problem inhering in such method resides in the fact that the heating of glass shapes, and particularly shapes of substantial size, such as an arcuate section of a revolving door, to the temperature range necessary for effecting tempering, renders the glass subject to deformation, whereby the glass will sag or change its shape to a greater or lesser degree, depending upon such factors as the size and curvature of the piece, temperature, manner in which the sheet is supported during tempering, etc.

It will be appreciated that even minor deflections or deformations will render the glass useless for installations wherein the glass must be maintained within reasonably precise tolerance limits.

The tempering of shaped articles without substantial distortion has been effected by fabricating special jigs, molds or like support elements which prevent distortion of the heated article. While it is practicable to fabricate such jigs, molds and the like for high volume production, such as automobile windshields, wherein hundreds of thousands of identical tempered glass elements are to be produced, the cost of forming molds for the production of thousands of units or fewer, renders the procedure prohibitively expensive.

A further difficulty in working with tempered glass is that the glass, after tempering, cannot normally be cut, ground or similarly processed. Thus, optical lenses, the surfaces of which must be formed with precise curvatures, cannot be tempered by conventional methods since the heating and quenching steps would involve sufficient lowering of the glass viscosity to permit slight deformation of shape of the glass. As noted, a lens cannot normally be tempered and then polished to final shape.

SUMMARY

The present invention is related to a method and apparatus for tempering glass articles and particularly shaped glass articles, characterized in that the tempering process may be carried out without significant deformation of the article and without the necessity for providing shaped support means for the glass during the procedure.

The method is characterized by the step of subjecting the glass to be tempered to a source of homogeneous heat (as hereinafter defined) while simultaneously subjecting the surfaces of the glass to quenching influences whereby at least the surfaces of said glass are retained at a sufficiently low temperature and, hence, high rigidity (viscosity) as to preclude deformation of the glass, while the interior portions of the glass are sufficiently hot and, hence, mobile, as to be subject to tempering. The hard skin surfaces of the glass in essence act as a supportive mold and, thus, the necessity for providing external mechanical support means is eliminated.

The invention further relates to apparatus for practicing the method as hereinabove set forth.

It is accordingly an object of the invention to provide a method and apparatus for tempering glass articles, and particularly shaped glass articles whereby at least certain portions of the surfaces of the articles are at all times maintained at a temperature sufficiently low to retain the structural integrity of the article against deformation under the influences of gravitation or other forces.

A further object of the invention is the provision of a method of tempering glass articles which includes the step of subjecting the article to a source of homogeneous heat while preferentially extracting heat from the surfaces of the article, whereby there is set up within the article a temperature differential, interior portions of the article being at or above the annealing temperature of the glass while the surfaces of said article are cooled, thus to temper the article.

A further object of the invention is the provision of a method of tempering glass articles which enables the articles to be processed without sagging or distortion in the course of tempering and without the necessity for providing molds, templates or like mechanical supports particularly configured to engage the surfaces of the article.

A further object of the invention is the provision of apparatus for practicing the method as hereinabove set forth.

To attain these objects and such further objects as may appear herein or be hereinafter pointed out, reference is made to the accompanying drawings, forming a part hereof, in which.

Figure 1:
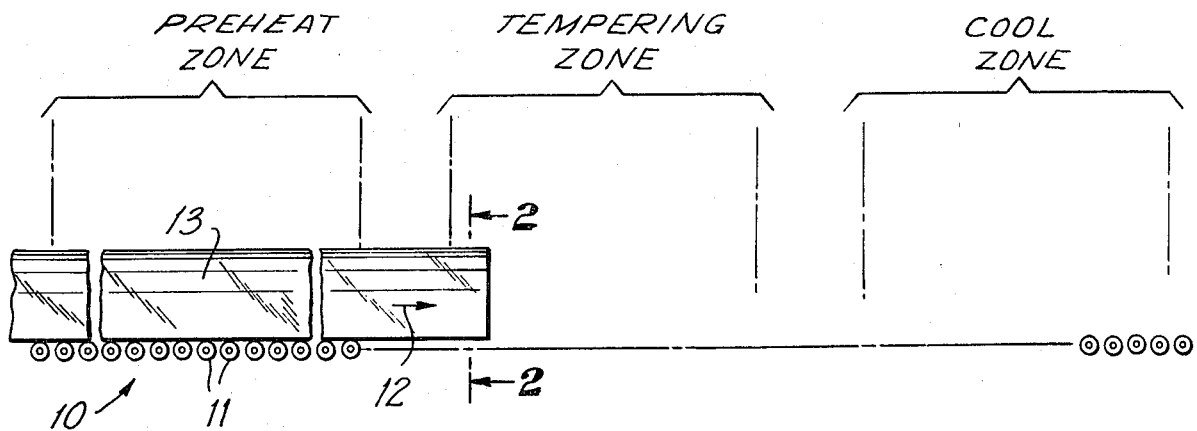
FIG. 1 is a schematic, side elevational view of an apparatus for practicing the method in accordance with the invention.
Figure 2:
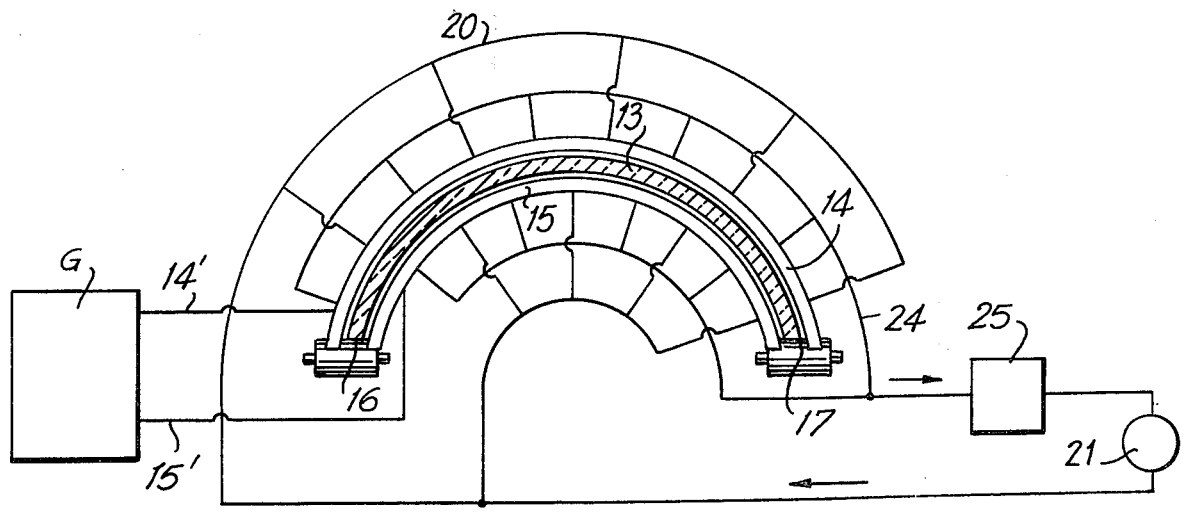
FIG. 2 is a sectional view taken on the line 2—2 of FIG. 1.

As will be appreciated from the preceding discussion, a principal contribution of the instant invention lies in the provision of a method and apparatus for tempering glass which includes the step of homogeneously heating the glass while simultaneously preferentially extracting heat from the surfaces thereof to maintain the surfaces rigid or substantially rigid and, hence, render the glass self-supporting and free from tendencies to sag or become distorted.

The term "homogeneous heating" is intended to refer to a heating procedure wherein the body of the glass is heated essentially equally throughout as opposed to conventional heating mechanisms which are preferentially effective at the surface of the glass, such conventional methods depending principally on conduction for heating of the interior.

By way of example, and without limitation, a preferred heating method involves so called dielectric heating wherein a pair of electrodes are connected as capacitor plates to the output of a high frequency (above 1 megahertz) high power generator, using the glass to be heated as the dielectric component between said electrodes. It should be understood that the method is not limited to dielectric heating and satisfactory results may be obtained through the use of certain ultrasonic heating procedures and radiant heating procedures wherein the wave length of the ultrasonic and radiant energy is selected in such manner as to excite the glass molecules essentially at a constant rate throughout the body of the glass rather than preferentially at the surface.

It will be further understood that the glass material may be especially formulated to render the same absorptive of energy in a particular band or bands, to render the heating step especially efficient or especially useful with a particular type of electromagnetic or other radiation.

By way of example, and without limitation, and for purposes of complying with statutory requirements, the method and apparatus of the illustrated embodiment of the invention employs as the homogeneous heating source a dielectric heater comprising a pair of conductive plates spaced closely to either side of the glass to be tempered, a specific heating unit tested having operated at frequencies of about 10 megahertz at a power capacity of at least 7 kw per square foot of glass. In the illustrated embodiment, the electrodes or plates are connected as capacitor plates to the output of a high frequency generator, with the glass (and the small amount of air existing between the plates and glass) acting as the dielectric. The energy required to be applied will vary in accordance with a multiplicity of factors, including mass to surface area ratio of the glass, the mass of glass to be heated in a given time increment, composition of the glass, type and volumetric flow of quench, and spacing of the glass from the electrodes.

It will be further understood by a skilled worker in the art of homogeneous heating that through appropriate selection of the enumerated and other factors, modifications and variations of the parameters of the heating mechanism to tailor the same to a specific application may be made.

Referring now to FIG. 1, there is diagrammatically shown a conveyor 10 comprised of a series of driving rollers 11, on which rollers there is mounted for movement in the direction of arrow 12 a glass article to be tempered—in this instance an arcuate segment 13 intended to form a part or section of a revolving door installation. The door section 13 is advanced through a preheat zone wherein the temperature of the glass section 13 is increased from room temperature to a desired higher temperature well below the annealing temperature of the glass. Any heating source (not necessarily a homogeneous heating source) is employed in the preheat zone, such as, for example, hot wire radiant heaters, etc. Preferably the glass leaving the preheating zone is in the temperature of about 400°C or more, which temperature, for a conventional soda-lime glass formulation, is well below the strain relief point, the glass thus being self-supporting against normal gravitational stresses.

The temperature at which the glass leaves the preheat zone may be adjusted in accordance with the susceptibility of the particular glass element to deformation, e.g. if the cross-sectional configuration of the glass is such as to render the glass unlikely to be distorted, as is the case with relatively thick glass having a sharp radius of curvature, it is preferred to preheat the glass to a higher temperature than would be the case with a thinner glass article or a glass article curved about a larger radius of curvature and, hence, more susceptible to flattening under its own weight.

While it is technically possible to raise the glass to the desired temperature for tempering purely through the use of dielectric heating, for example, preheating by non-dielectric means is preferred since dielectric equipment is substantially more expensive than conventional heaters. Additionally, the dissipation factor of glass at room temperature is such that only 1 percent of the high frequency energy is transformed to heat within the glass. At 100°C about 3 percent of the energy is transformed to heat, and at 200°C the dissipation factor at a wave length of 1 megahertz rises to about 20 percent, soda-lime glass formulations at temperatures above 300°C becoming increasingly responsive to dielectric heating. It will thus be appreciated that, due to the expense of dielectric heating equipment and the low efficiency of dielectric heating of cold glass, preheating by other than dielectric means is preferred.

In the apparatus depicted in FIG. 1, the glass article to be tempered is advancing through progressive treatment zones and, hence, lead portions of the article will be at higher temperatures than trailing portions. Thus, various increments of the same segment will, in the illustrated embodiment, be subjected to different aspects of the tempering process at the same instant of time. Likewise, while in FIG. 1 the three zones, namely, preheat, temper, and cool, are for illustrative purposes indicated to be of equal length along the conveyor path, this condition need not apply and typically the tempering zone will be substantially shorter than the other zones and, indeed, may constitute only a short transverse band or section of the total conveyor path.

The preheated lead end of the arcuate segment 13 emerges from the preheat zone and is passed to the tempering zone which, in the illustrated embodiment, comprises two arcuate electrodes 14, 15, preferably formed of metal but which may be of other conductive material. The electrodes 14, 15 are curved in accordance with the curvature of the glass section to be processed, the electrodes being so positioned as to define between the glass and the electrodes a minimal spacing for the passage of quench fluid, normally cooled air. Preferably, in order to assure full tempering of the lower edges 16, 17 of the arcuate segments, the electrodes 14, 15 extend to a level below the lowermost edges 16, 17. This configuration is achieved, where the tempering zone is short, by having the said zone free of supportive rollers, support for the sheet being processed being provided by the training portions of the glass being disposed on the rollers 11 in the preheat zone, the lower edges of the glass adjacent the leading edge, after having traversed the tempering zone, being supported on the rollers 11 in the cooling zone.

Such arrangement, wherein rollers are eliminated from the tempering zone, is advantageous in that heating of the rollers is avoided. It is, however possible where the tempering zone is of substantial length, to utilize ceramic rollers and to contour the lowermost edges of the electrodes in such manner that elements thereof extend downwardly partway into the space approaching the nip of the rollers, whereby the rollers may support the lower edges of the glass, the said lower edges being nonetheless disposed between electrode elements which function to treat the same.

Where it is unimportant whether or not the edge portions of the glass are tempered, i.e., in instances where such edges will be maintained within surrounding structures, such as glazing structures, etc., the edges may rest on ceramic rollers within the tempering zone, and the electrodes may terminate above the rollers.

The electrodes 14, 15 are provided with means for circulating cooling fluids in the even pattern required for tempering against the opposite surfaces of the glass. Various configurations of fluid circulating means may be satisfactorily employed.

Figure 3:
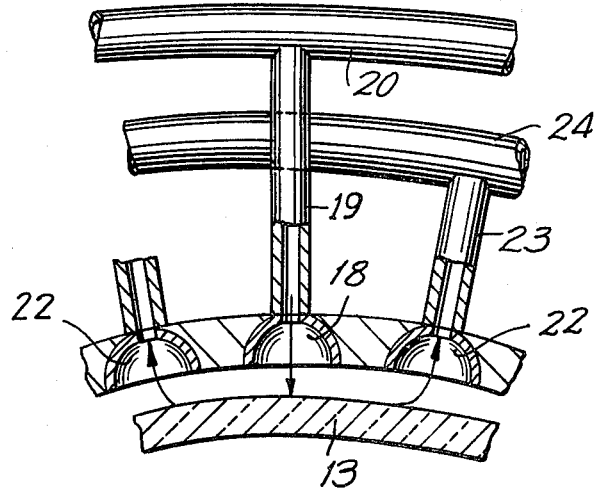
FIG. 3 is a magnified sectional view through an electrode in accordance with the apparatus.

In FIG. 3 there is shown a magnified fragmentary sectional view through electrode 14, illustrating a series of dispenser apertures, such as aperture 18, connected to a conduit 19 for cooling fluid, typically air at ambient temperatures, the conduit 19 being, in turn, connected to a manifold 20 leading to a source, such as a pump 21, of cooling fluids.

The electrode 14 is provided with suction apertures 22 connected by conduits 23 to a vacuum or exhaust manifold 24.

Preferably a heat exchanger 25 is interposed between the vacuum manifold 24 and the pump 21.

It will be appreciated that in the tempering zone, air circulated against the heated glass through the outlet jets 18 will extract heat rapidly from the surfaces of the glass, the heated air being drawn outwardly into the manifold 24 through suction outlets 22 and conduits 23, cooled in the heat exchanger 25, the cooled air being returned to the pressure manifold 20. Obbiously, the arrangement of manifolds may be varied in a multitude of ways, i.e., in lieu of a heat exchanger, air at ambient temperature may be drawn into the pump and the heated air drawn out from the manifold may be exhausted into the atmosphere or may be introduced into the preheating zone, and particularly to the initial stages thereof to aid in the preheating process.

While the electrodes 14, 15 in the illustrated embodiment have been depicted as arcuate metallic segments provided with closely spaced alternate outlets for cooling and suction, it will be readily recognized that the particular construction and configuration of the electrodes will advantageously be varied to suit the requirements of the particular article or articles being processed. For instance, while it is practicable to form electrodes as illustrated where a fairly substantial volume of arcuate segments of a given shape are to be fabricated, it may be desirable to form a more temporary electrode arrangement where a lesser run of glass elements will be processed.

Numerous means for constructing temporary electrodes will occur to the skilled worker in the light of the preceding discussion. By way of example, it is feasible to provide electrodes of spring metal material which may be deformed to any of a variety of arcuate or other shapes, to match the shape of the item to be processed. Similarly, it is feasible to form the electrodes of lengths of metallic tubing stacked in side by side position, the distal ends of the tubes being supported within appropriately shaped clamps which temporarily mechanically and electrically connect the tubes in any desired configuration corresponding to the configuration of the clamp. The last mentioned arrangement has the advantage that the tubes, which may be trapezoidal in transverse section, the wider base of the trapezoid forming the inner portion of the curve, may be disassembled and reassembled in any other desired configuration, the sole modification required being a change in the shape of the end clamps.

It will be appreciated that the clamped-together tubes, with their inner or glass facing surfaces tightly engaging each other, will act as a single surface or electrode, and that the tubes may incorporate appropriate quench and suction jets.

The glass components traversing the tempering zone will be simultaneously subjected to heating effects from the honogeneous heat source, which heating effects, as noted, act essentially equally throughout the thickness of the glass. At the same time as the heat is being homogeneously introduced into the glass, heat is preferentially extracted from the surfaces and surface-adjacent layers of the glass by the quency means, whereby there is set up within the glass a condition by which interior portions of the glass are raised to temperatures in the range of annealing temperatures of the glass while the surfaces of the glass are substantially cooler.

Normally a temperature differential in the range of about 100° C or more should be achieved at some point within the tempering zone, i.e., interior portions of the glass should be at or above the annealing temperature whereas skin surfaces juxtaposed to such heated portions are about 100° C below the temperature of the interior. Such temperature differential assures that the glass will be fully tempered while at the same time the cooler exterior surfaces will remain sufficiently rigid to preclude any sagging or deformation of the glass while it is being tempered. It is feasible to temper where the interior portions of the glass are somewhat below the annealing range by extending the time during which the temperature differential within the glass is maintained.

In the illustrated embodiment, the reference letter G refers to a high frequency generator connected by conduits 14' and 15' to the electrodes 14 and 15, respectively.

It will be recognized that such factors as glass formulation, speed of advance of the glass article, power consumption, mass of the glass, quench rate and introductory temperature must be coordinated in each instance, such coordination requiring, as is the case with conventional tempering procedures, a degree of trial and error experimentation.

As the glass or glass components leave the tempering zone, they are introduced into a cooling zone, bringing the over-all temperature of the glass to a desired level.

The glass emerging from the cooling zone is fully tempered, including the edge portions thereof, except where, as noted, the electrode configuration is not such as to encompass a heat treatment of the edges.

While the apparatus has been illustrated in conjunction with the processing of an arcuate glass segment, it will be readily recognized that the procedures are not limited for use with any particular shape.

In similar fashion, while the tempering in the illustrated embodiment has been carried out on a continuous basis wherein certain portions of the article are simultaneously subjected to preheating, tempering, and cooling influences, it is practicable to carry out the procedure in sequential steps wherein the entirety of the article is preheated, thereafter the entirety of the article is tempered, and subsequently cooled. The treatment of smaller articles, such as lenses for eyeglasses or components of camera lenses, etc. are advantageously batch processed, as opposed to being progressively processed as shown in the illustrated apparatus.

Numerous variations will occur to those skilled in the art in the light of the instant disclosure. Accordingly, the invention is to be broadly construed within the scope of the appended claims as generically directed to a tempering procedure avoiding significant distortion of a glass article by incorporating as a step thereof the employment of a homogeneous heat source of whatever nature which is substantially equally effective throughout the thickness of the glass, or preferential in heating the interior, in conjunction with a quenching preferentially effective on the skin or surfaces of the glass.

Having thus described the invention and illustrated its use, what is claimed as new and is desired to be secured by letters patent is:

1. The method of tempering an elongated glass article having a regular, non-planar cross section defining interior and exterior main surfaces and having adjacent edge portions, without significant deformation thereof, comprising the steps of supporting the weight of said article on said edge portions, subjecting at least transverse increments of said article to a source of homogeneous heat while simultaneously quenching said surfaces while the article is supported on said edge portions to define within said article a temperature differential condition in which interior portions of said article are at temperatures at least as high as the annealing temperature of said glass, while said surfaces of said glass are at a temperature sufficiently below said annealing temperature to remain rigid and, hence, susceptible of supporting the weight of said article without deformation under gravitational influences.

2. Apparatus for the tempering of a glass article comprising support means for said article, a pair of homogeneous heater means in proximate spaced relation to said surfaces of said article for adding heat to said article at an essentially constant rate throughout the thickness of said article, quench means extending through said heater means, said quench means including apertures adjacent said surfaces, and means for conducting quench fluids through said apertures and against said surfaces, and suction means for drawing off said quenching fluids after the same have been directed against said surfaces, said quench means acting on said article while the same is subject to the influences of said homogeneous heater means for preferentially extracting heat from the surfaces of said article, thereby to establish in said article a condition in which interior portions of said article are at temperatures approximating or exceeding the annealing temperature of said article while said surfaces are at temperatures substantially below the annealing temperature.

* * * * *